United States Patent
Link et al.

(10) Patent No.: US 7,627,409 B2
(45) Date of Patent: *Dec. 1, 2009

(54) METHOD FOR TRIGGERING A VEHICLE OCCUPANT RESTRAINT DEVICE

(75) Inventors: Andrea Link, Munich (DE); Willibald Watzka, Aichach (DE); Jan Urbahn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 254 days.

This patent is subject to a terminal disclaimer.

(21) Appl. No.: 11/352,254

(22) Filed: Feb. 13, 2006

(65) Prior Publication Data

US 2007/0247290 A1  Oct. 25, 2007

Related U.S. Application Data

(63) Continuation of application No. 11/216,102, filed on Sep. 1, 2005, now abandoned, which is a continuation of application No. 11/029,469, filed on Jan. 6, 2005, now abandoned, which is a continuation of application No. 10/831,367, filed on Apr. 26, 2004, now abandoned, which is a continuation of application No. PCT/EP02/10659, filed on Sep. 23, 2002.

(30) Foreign Application Priority Data

Oct. 25, 2001  (DE)  .............................. 101 52 749

(51) Int. Cl.
*G05D 3/00* (2006.01)
*B60R 21/26* (2006.01)
*B60Q 1/00* (2006.01)

(52) U.S. Cl. ........................... 701/45; 280/735; 340/436

(58) Field of Classification Search ................... 701/45; 340/436; 280/735
See application file for complete search history.

(56) References Cited

U.S. PATENT DOCUMENTS 4,166,641 A * 9/1979 Okada et al. ................. 280/735
4,958,851 A * 9/1990 Behr et al. ................... 280/735

(Continued)

FOREIGN PATENT DOCUMENTS

DE  4207153 A1  7/1993

(Continued)

OTHER PUBLICATIONS

International Search Report dated Feb. 12, 2002.

(Continued)

*Primary Examiner*—Khoi Tran
*Assistant Examiner*—Ian Jen
(74) *Attorney, Agent, or Firm*—Crowell & Moring LLP

(57) ABSTRACT

A method is provided for triggering a vehicle occupant restraint device, in which a sensor signal generated by a crash sensor is fed to a triggering device and to a clearing device supplying a clearing signal. The sensor signal is integrated in the clearing device and subjected to an examination algorithm. The output signal of at least one additional crash sensor is fed to the clearing device. Then, the two output signals are linked to one another and are subsequently integrated during an observation period. A clearing signal is generated when the integral exceeds a threshold value.

8 Claims, 2 Drawing Sheets

U.S. PATENT DOCUMENTS

| | | | |
|---|---|---|---|
| 5,202,831 A * | 4/1993 | Blackburn et al. | 701/46 |
| 5,390,951 A * | 2/1995 | Iyoda | 280/730.2 |
| 5,416,360 A * | 5/1995 | Huber et al. | 307/10.1 |
| 5,809,439 A * | 9/1998 | Damisch | 701/45 |
| 5,936,549 A * | 8/1999 | Tsuchiya | 340/903 |
| 6,070,113 A * | 5/2000 | White et al. | 701/45 |
| 6,095,554 A * | 8/2000 | Foo et al. | 280/735 |
| 6,167,335 A * | 12/2000 | Ide et al. | 701/45 |
| 6,170,864 B1 * | 1/2001 | Fujita et al. | 280/735 |
| 6,186,539 B1 * | 2/2001 | Foo et al. | 280/735 |
| 6,292,728 B1 * | 9/2001 | Masegi | 701/45 |
| 6,559,763 B2 * | 5/2003 | Murphy et al. | 340/436 |
| 6,647,331 B2 * | 11/2003 | Imai et al. | 701/45 |
| 6,837,516 B2 * | 1/2005 | Miyata et al. | 280/735 |
| 6,906,622 B2 * | 6/2005 | Kleinschmidt et al. | 340/436 |
| 7,231,803 B2 * | 6/2007 | Stuetzler | 73/12.01 |
| 2005/0006885 A1 * | 1/2005 | Link et al. | 280/735 |
| 2007/0200324 A1 * | 8/2007 | Urbahn et al. | 280/735 |

FOREIGN PATENT DOCUMENTS

| | | |
|---|---|---|
| DE | 4324753 A1 | 3/1994 |
| DE | 19632363 C1 | 1/1998 |
| DE | 19648917 A1 | 5/1998 |
| DE | 19740019 A1 | 3/1999 |
| DE | 19909296 A1 | 9/2000 |
| DE | 19913675 A1 | 9/2000 |
| GB | 2310303 A | 8/1997 |
| GB | 2347542 A | 9/2000 |

OTHER PUBLICATIONS

German Search Report dated Apr. 26, 2002.

* cited by examiner

METHOD FOR TRIGGERING A VEHICLE OCCUPANT RESTRAINT DEVICE

CROSS-REFERENCE TO RELATED APPLICATIONS

This application is a continuation of U.S. application Ser. No. 11/216,102, filed Sep. 1, 2005, now abandoned, which is a continuation of U.S. application Ser. No. 11/029,469, filed Jan. 6, 2005, now abandoned, which is a continuation of U.S. application Ser. No. 10/831,367, filed Apr. 26, 2004, now abandoned, which is a continuation of PCT/EP02/10659, filed Sep. 23, 2002, which claims priority under 35 U.S.C. §119 to German Application No. 101 52 749.7, filed Oct. 25, 2001, the entire disclosures of which are expressly incorporated by reference herein.

BACKGROUND AND SUMMARY OF THE INVENTION

The invention relates to a method of triggering a vehicle occupant restraint device. A sensor signal generated by a crash sensor is fed to a triggering device and to a clearing device supplying a clearing signal. The sensor signal is integrated in the clearing device and subjected to an examination.

A known method of this type is disclosed in British Patent document GB-2310303 A. The output signal of a single sensor is checked by various algorithms. If the one sensor supplies faulty signals, these should be recognized as being faulty. The method of operation of the clearing device is, therefore, dependent on the output signal. When the faulty signals have an appearance which is similar to that of signals which are typical of a crash, the differentiation is no longer possible. However, this may render the clearing device ineffective. A typical case of an output signal which cannot be recognized, or at least cannot be recognized with sufficient certainty, is that of a sensor with a "cold" soldered site. The latter has a slightly increased or fluctuating resistance. In the case of a method of operation which stresses the vehicle considerably, but is otherwise normal per se, the sensor generates signatures, which cannot be differentiated from a real crash.

It is an object of the invention to provide a method of triggering a vehicle occupant restraint device, in which a fuel sensor signal output by a crash sensor is fed to a triggering device and to a clearing device supplying a clearing signal, which has a secure and reliable method of operation of the clearing device.

The invention achieves this object by providing a method of triggering a vehicle occupant restraint device, in which a fuel sensor signal output by a crash sensor is fed to a triggering device and to a clearing device supplying a clearing signal, in which clearing device the sensor signal is integrated and subjected to an examination algorithm. The output signal of at least one additional crash sensor is also fed to the clearing device, in that the two output signals are linked to one another and are subsequently integrated during an observation period, and in that the clearing signal is generated when the integral exceeds a threshold value.

The method of operation of the clearing device is thus a function of at least one other crash sensor. Since it is highly probable that at least one sensor operates in a reliable manner, by means of this reference, a faulty second sensor can be reliably detected and it can be achieved that this fault is not exhibited in a faulty triggering of a restraint device.

Advantageous embodiments of the invention are described and claimed herein.

For triggering a vehicle occupant restraint system, such as an air bag, a belt tightening device, a rollover bar, etc., a clearing is required by use of a Safing algorithm. Input quantities include values $a_x(SFZ)$ and $a_y(SFZ)$ of an acceleration sensor in the vehicle center in the X and Y direction (X=direction of the longitudinal vehicle axis, Y=direction transversely thereto); also included are the values $a_x(SASL)$ and $a_x(SASR)$ of acceleration sensors in the A columns on the left (=L) and on the right (=R) and in the X direction as well as the values $a_y(SBSL)$ and $a_y(SBSR)$ of acceleration sensors in the B columns on the left and the right in the y direction. The sensors are not shown.

According to the invention, the (kinetic) energy input is computed in a clearing device which is also not shown. In this case, a differentiation is made between horizontal (=X) and lateral (=Y) energy. For the determination of the energy values, two integrals I are computed, once in the horizontal direction $$I_x = \int_{t_x}^{t} (g_x \cdot a_x(SFZ) + a_x(SASL) + a_x(SASR)) dt$$

and once in the lateral direction $$I_y = \int_{t_y}^{t} (g_y \cdot a_y(SFZ) + a_y(SASL) + a_y(SASR)) dt$$

The weighting $g_x/g_y$ is firmly parametrized and is used for the equalization of signal levels at the various positions in the vehicle center and at the A or B columns.

The computing of the integrals $I_{x,y}$ starts at the point in time $t_{x,y}$ as soon as the amount of an acceleration value $|a_{x,y}|$ has in each case exceeded a defined threshold. The thresholds are clearly above the noise band and are not reached during the normal driving operation on an even road. When the acceleration values fall again and are all situated below their threshold values, the computing is terminated and the value of the integral is reset.

The integrals I are also reset when only one acceleration sensor exceeds its threshold value within a defined time window. The time window is initiated when the output signal of the acceleration sensor reaches the threshold value.

DETAILED DESCRIPTION OF THE DRAWINGS

As a further explanation, the generating of a clearing signal in the event of a frontal crash is described here. The case of a lateral crash is to be treated in a corresponding manner.

For generating a clearing signal in the event of a frontal crash, three conditions should be met within a parametrizable time period.

1. The integral $I_x$ has to exceed a threshold value J: $I_x > J_x$.

2. The amount of a first acceleration sensor has to exceed the pertaining threshold:

$$|a_x(SFZ)| > S_x(SFZ) \text{ or } |a_x(SASL)| > S_x(SASL) \text{ or } |a_x(SASR)| > S_x(SASR)$$

3. The amount of a second acceleration sensor has to exceed the pertaining threshold.

Figure 1:
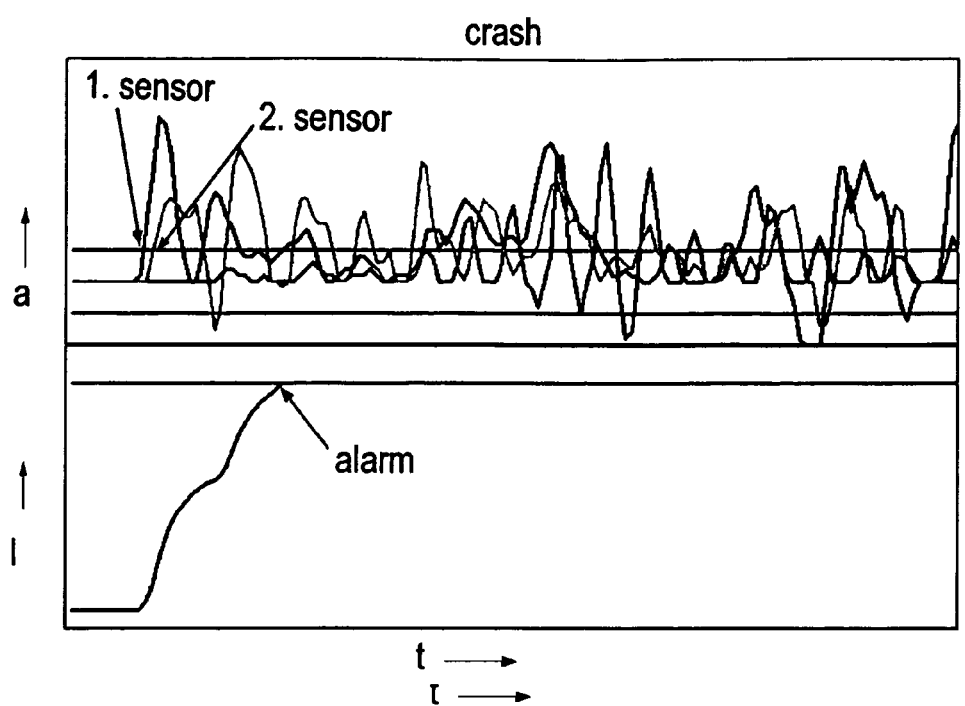
FIG. 1 illustrates sensor and alarm outputs resulting from a frontal crash.
Figure 2:
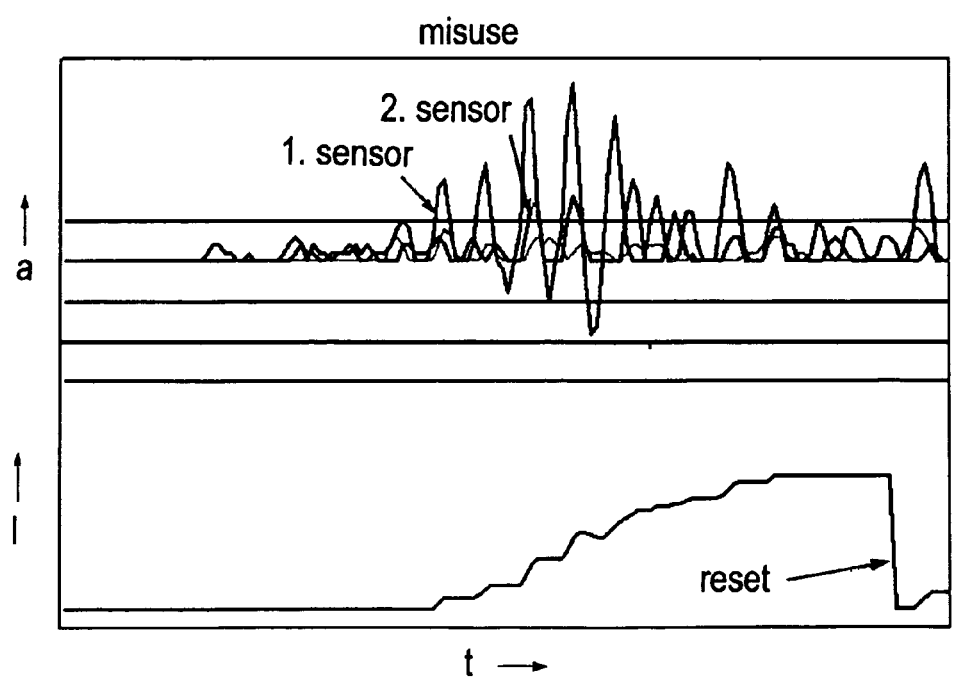
FIG. 2 illustrates sensor outputs for a non-crash event.
Figure 3:
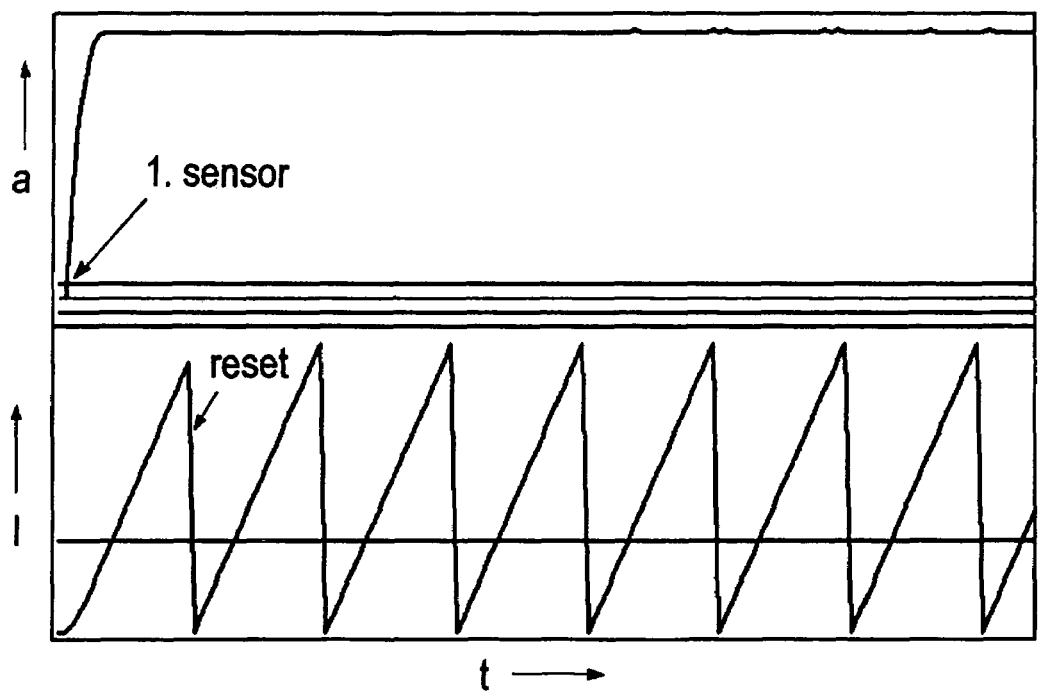
FIG. 3 illustrates signals signifying sensor malfunctioning.

The signal forms illustrated in FIGS. 1 to 3 are used for explaining the method of operation of the clearing device in different situations.

FIG. 1 shows the signal form in the event of a frontal crash. Here, all three conditions are met and the clearing signal is supplied.

The top portion of FIG. 1 shows the acceleration $a_x$ of the left A column (solid line of 1. sensor), the right A column (broken line), and at the tunnel (dotted line) vs. time t. The horizontal line marks the acceleration threshold values $S_x$. In the example, the threshold values are equal to $S_x(SFZ)=S_x(SASL)=S_x(SASR)$. The bottom portion of FIG. 1 shows the acceleration integral $I_x$ vs. time t. Here also, the horizontal line represents the threshold value $J_x$. The clearing signal is generated after the two sensors exceed the acceleration threshold and after exceeding the integral threshold.

FIG. 2 shows the case of a misuse (atypical stressing of the vehicle, for example, by driving over potholes at a high speed). The clearing signal is not generated because the integral threshold $J_x$ is not exceeded. The energy input is not sufficient.

The top portion of FIG. 2 shows the acceleration $a_x$ of the left A column (solid line), the right A column (broken line) and at the tunnel (dotted line), and the threshold values $S_x(SFZ)=S_x(SASL)=S_x(SASR)$ vs. time t. The bottom portion of FIG. 2 shows the acceleration integral $I_x$ and threshold value $J_x$ vs. time t. The integral threshold is not exceeded and the alarm is not set; the integral is reset.

FIG. 3 shows the malfunctioning of a sensor. The sensor jumps from a=0 to a high acceleration value. This signature could be created, for example, by the lifting-off of a soldered pin. The integral threshold and an acceleration threshold are reached, but there is no exceeding of a second acceleration threshold. As a result, the clearing signal is also not generated in this case.

In the top portion of FIG. 3, $a_x(SASL)=a_x(SASL)$ (broken line) and at the tunnel (dotted line), and the threshold values $S_x(SFZ)=S_x(SASL)=S_x(SASR)$ vs. time t. The bottom portion of FIG. 3 shows the acceleration integral $I_x$ and threshold value $J_x$ vs. time t. Since the acceleration threshold is exceeded by only one sensor, no alarm is set.

In this manner, a clearing signal can be generated neither in the case of a misuse, nor in the case of a sensor defect or malfunction.

The invention claimed is:

1. A method of triggering a vehicle occupant restraint device, the method comprising the acts of:
   generating a sensor signal by a first crash sensor and feeding the sensor signal to a triggering device via a clearing device that supplies a clearing signal, in which clearing device the sensor signal is integrated and subjected to an examination algorithm;
   generating an output signal of at least one additional crash sensor and feeding the output signal to the clearing device;
   linking the sensor signal and the output signal to one another and subsequently mathematically integrating the linked sensor and output signals into an mathematically integrated output during an observation period; and
   generating the clearing signal when the mathematically integrated output exceeds a defined threshold value.

2. The method according to claim 1, the method further comprising the act of generating the clearing signal when at least one of the sensor signal and the output signal exceeds a defined threshold value.

3. The method according to claim 1, further comprising the act of generating the clearing signal when both the sensor signal and the output signal exceed defined threshold values, respectively.

4. The method according to claim 2, further comprising the act of generating the clearing signal when both the sensor signal and the output signal exceed defined threshold values, respectively.

5. The method according to claim 1, further comprising the act of resetting a value of the integral to a zero value when one of the sensor signal and the output signal does not reach a threshold value during the observation period.

6. The method according to claim 2, further comprising the act of resetting a value of the integral to a zero value when one of the sensor signal and the output signal does not reach a threshold value during the observation period.

7. The method according to claim 3, further comprising the act of resetting a value of the integral to a zero value when one of the sensor signal and the output signal does not reach a threshold value during the observation period.

8. The method according to claim 1, wherein the linked sensor and output signals are simultaneously integrated during the observation period.

\* \* \* \* \*

UNITED STATES PATENT AND TRADEMARK OFFICE
CERTIFICATE OF CORRECTION

PATENT NO. : 7,627,409 B2 Page 1 of 1
APPLICATION NO. : 11/352254
DATED : December 1, 2009
INVENTOR(S) : Link et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 321 days.

Signed and Sealed this

Twenty-first Day of December, 2010

David J. Kappos
*Director of the United States Patent and Trademark Office*